United States Patent
Ogino et al.

[11] Patent Number: 5,995,279
[45] Date of Patent: *Nov. 30, 1999

[54] OPTICAL ELEMENT, AND TAKING OPTICAL SYSTEM AND IMAGE PICKUP APPARATUS USING IT

[75] Inventors: Shigeru Ogino, Tokyo; Shuichi Kobayashi, Yokohama, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/553,921

[22] Filed: Nov. 6, 1995

[30] Foreign Application Priority Data

Nov. 9, 1994 [JP] Japan .................................. 6-274927
Jan. 27, 1995 [JP] Japan .................................. 7-011715

[51] Int. Cl.[6] .............................. G02B 3/00; G02B 5/18
[52] U.S. Cl. .......................... 359/355; 359/558; 359/566; 359/570; 348/291; 348/342
[58] Field of Search .................................. 359/355, 558, 359/563, 564, 570, 722, 569, 350, 356, 566; 348/291, 342; 382/264

[56] References Cited

U.S. PATENT DOCUMENTS

| 3,940,788 | 2/1976 | Abe et al. . |
| 4,068,260 | 1/1978 | Ohneda et al. . |
| 4,987,884 | 1/1991 | Nishioka et al. ............................ 128/6 |
| 5,177,605 | 1/1993 | Takahashi et al. ......................... 358/98 |
| 5,280,388 | 1/1994 | Okayama et al. ........................ 359/570 |
| 5,283,691 | 2/1994 | Ogasawara ............................... 359/569 |
| 5,473,471 | 12/1995 | Yamagata et al. ....................... 359/569 |
| 5,589,882 | 12/1996 | Shiraishi et al. ........................ 348/340 |

FOREIGN PATENT DOCUMENTS

| 2134943 | 6/1979 | Germany ................................ 359/563 |
| 64-00916 | 1/1989 | Japan .............................. G02B 27/46 |
| 64-00917 | 1/1989 | Japan .............................. G02B 27/46 |
| 3-23415 | 1/1991 | Japan .............................. G02B 27/46 |
| 5-288985 | 11/1993 | Japan .............................. G02B 13/04 |

*Primary Examiner*—Cassandra Spyrou
*Assistant Examiner*—John Juba, Jr.
*Attorney, Agent, or Firm*—Fitzpatrick, Cella, Harper & Scinto

[57] ABSTRACT

An optical element comprises a lens made of a material for shutting off all or most of light in the infrared region, and an optical low-pass filter, wherein the lens and the optical low-pass filter are incorporated with each other.

6 Claims, 5 Drawing Sheets

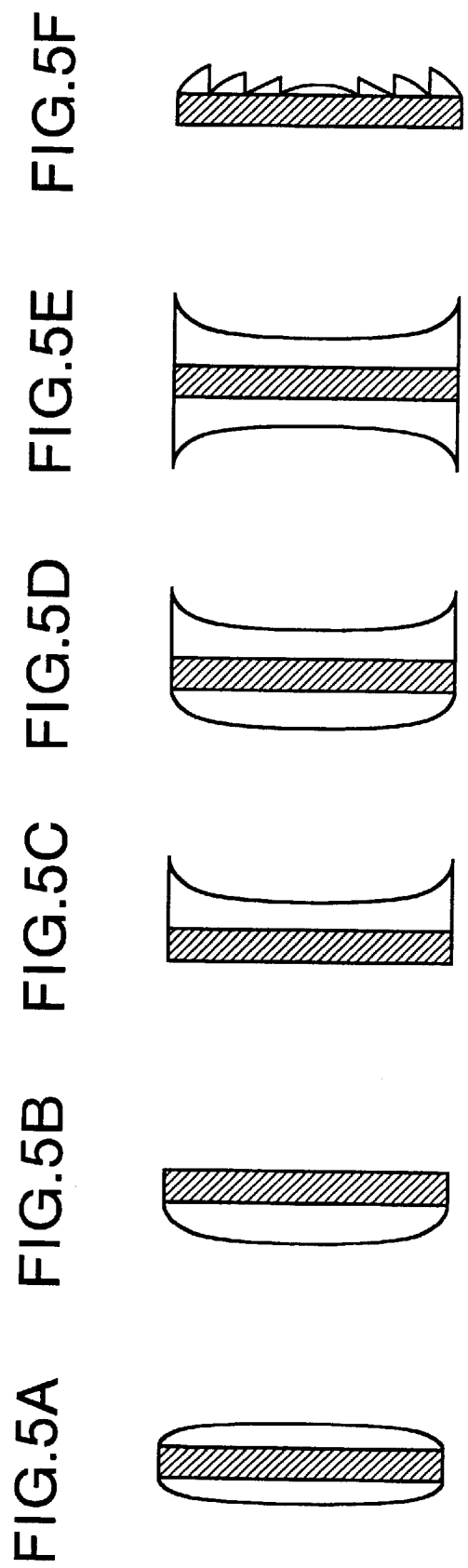

OPTICAL ELEMENT, AND TAKING OPTICAL SYSTEM AND IMAGE PICKUP APPARATUS USING IT

BACKGROUND OF THE INVENTION

1. Field of the Invention

The present invention relates to an optical element, and more particularly to an optical element used in image pickup apparatus such as video cameras or electronic cameras for obtaining image information by discretely sampling spatial image information by a solid state image sensing device or an image pickup tube, etc.

2. Related Background Art

A variety of image pickup systems have been developed heretofore for obtaining image information by optically spatially sampling an image of an object, for example, by a solid state image sensing device or an image pickup tube in video cameras, electronic cameras, etc.

Since the solid state image sensing devices, image pickup tubes, etc. of this kind demonstrate high spectral sensitivity in the long wavelength region, there is a need to shut off infrared rays etc. in the long wavelength region. For that purpose, the conventional image pickup systems employed a taking optical system including a filter for cutting light in the infrared region.

If an object should include a component of a higher frequency than the half of the sampling frequency for obtaining image information using the solid state image sensing device or the like, an image would have a structure or a pseudo color which the object did not originally have, thereby degrading the quality of image. Therefore, the conventional image pickup systems were arranged to include an optical low-pass filter for shutting off high frequency components.

However, when the image pickup systems had separate members of the infrared cut filter, the optical low-pass filter, and the lens, there were problems of increasing the size and weight of total image pickup system and also increasing the cost.

SUMMARY OF THE INVENTION

An object of the present invention is to provide an optical element simultaneously having an infrared cutting function, an optical low-pass filter function, and a lens function.

To achieve the above object, an optical element of the present invention is constructed in such a manner that an optical low-pass filter is incorporated with a lens made of a material for shutting off all or most of light in the infrared region.

The optical low-pass filter may take a form in which it is provided on at least one lens surface or a form in which it is provided inside the lens.

The optical low-pass filter is desired to be a phase grating.

In a preferred embodiment, the phase grating has a regular structure in at least one direction.

In a more desired embodiment, a cross section in the direction of the regular structure, of each of projections constituting the phase grating is trapezoidal, sinusoidal or rectangular.

The optical element according to the present invention is preferably produced by injection-molding, cast-molding or injection compression molding the material for shutting off all or most of light in the infrared region.

In a more desired embodiment, the optical low-pass filter is made of the same material as the lens and is formed simultaneously upon molding the lens.

Another form of the optical element of the present invention comprises a flat plate for shutting off all or most of the light in the infrared region, and a lens formed on the flat plate.

Another form of the optical element of the present invention is desired to have an optical low-pass filter.

A compact and low-cost system can be provided by applying the optical element of the present invention to a taking optical system or an image pickup apparatus.

BRIEF DESCRIPTION OF THE DRAWINGS

FIGS. 5A to 5F are drawings to show various forms of the optical element in the second embodiment of the present invention.

DETAILED DESCRIPTION OF THE PREFERRED EMBODIMENTS

Figure 1:
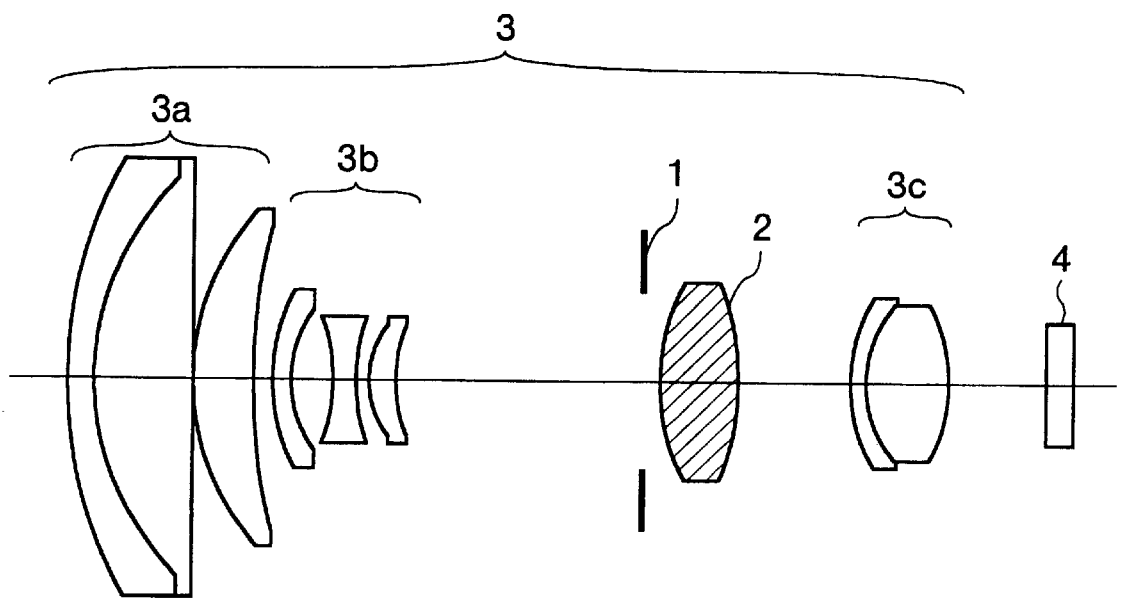
FIG. 1 is a schematic drawing to show an image pickup system in the first embodiment of the present invention.

FIG. 1 shows an embodiment of the present invention and is a schematic drawing of an image pickup system for video cameras, electronic cameras, etc. Reference numeral 1 designates a stop, and 2 an optical element of the present invention, which functions as an afocal lens unit. Numeral 3 denotes the whole of a taking optical system, wherein 3a is a positive fixed lens, 3b a negative variator, and 3c a positive focusing lens. Further, numeral 4 represents an image pickup device such as a CCD. The optical element 2 is made of a material that does not transmit light in the infrared region. In the present embodiment this material may be one of well known materials, for example, a material containing a copolymer obtained by copolymerization of monomer mixture consisting of a monomer containing a phosphoric acid group and a monomer copolymerizable therewith, and a metal salt mainly containing a copper salt, as described in Japanese Laid-open Patent Application No. 6-118228.

Figure 2A:
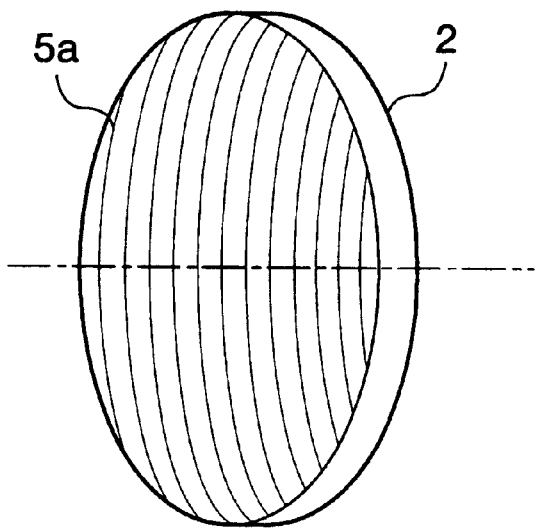
FIGS. 2A and 2B are perspective views of optical elements in the first embodiment of the present invention.
Figure 2B:
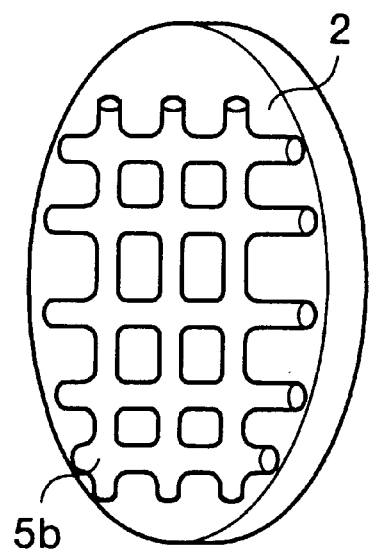
Figure 3A:
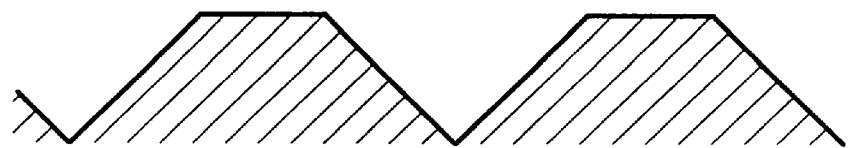
FIGS. 3A to 3D are enlarged views of the optical element surfaces in the first embodiment of the present invention.
Figure 3B:
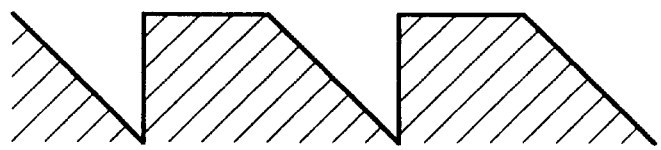
Figure 3C:
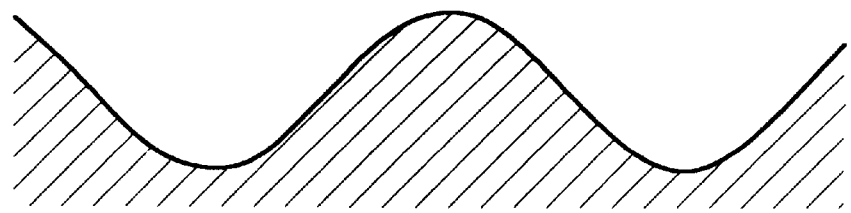
Figure 3D:
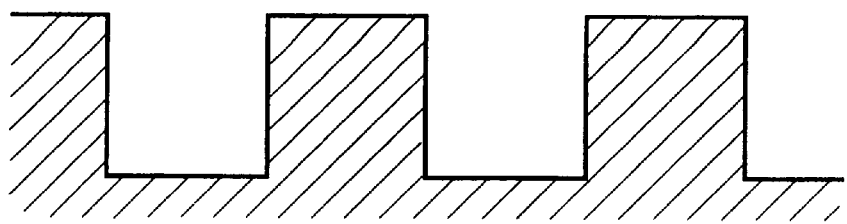

FIGS. 2A, 2B are perspective views of optical elements 2 in the present embodiment.

In the optical element 2 as shown in FIG. 2A, an uneven portion 5a of a grating pattern having a cross section as shown in FIGS. 3A, 3B, 3C or 3D is formed on at least one lens surface, which has a function as an optical low-pass filter as well as a function to cut infrared rays. The shape of the uneven portion does not have to be limited to the above shape, but may be of a sinusoidal wave or a rectangular wave. Another conceivable arrangement is that, instead of the optical member on the lens surface, an optical member 5b of a grating pattern having the function as an optical low-pass filter is provided inside the element, as shown in FIG. 2B. If the material for forming the optical element 2 is the material as described above, molding can be used. Then, the uneven portion of the grating pattern can be formed upon molding, which can decrease the fabrication cost. There is injection-molding, cast-molding, injection or compression molding, as methods of molding. The function as an optical low-pass filter in the present embodiment is achieved by utilizing a phase change of light passing the uneven portion of the grating pattern, and the uneven portion is located in the vicinity of the stop 1 in the taking optical system 3, as shown in FIG. 1.

The uneven portion 5a may be formed as a separate member from the lens and then cemented to the surface of the lens. Further, the optical low-pass filter function may be realized by an amplitude grating.

Both of the surfaces of the optical element are coated with a known antireflection film (not shown).

Figure 4:
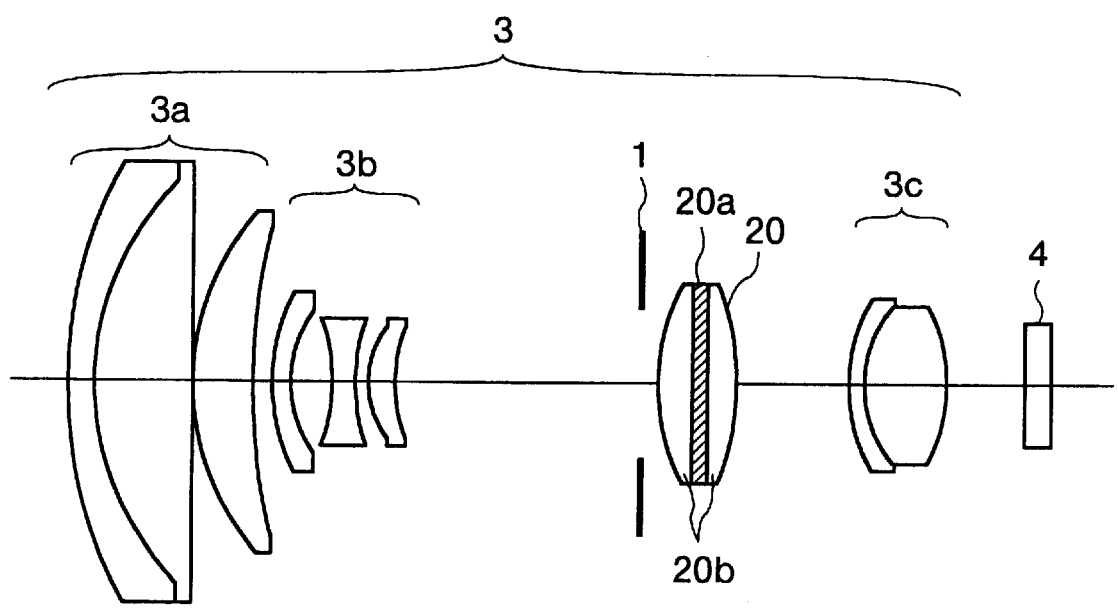
FIG. 4 is a schematic drawing to show an image pickup system in the second embodiment of the present invention.

The second embodiment is next explained referring to FIG. 4.

Since elements with the same reference numerals in FIG. 4 as those in FIG. 1 have the same functions, description thereof is omitted herein.

Reference numeral 20 designates the optical element in the second embodiment of the present invention. In the optical element, 20a is a flat plate made of a material that does not transmit the light in the infrared region, similarly as the optical element 2 in the first element. Further, 20b is a lens made of a plastic material on the both surfaces of the flat plate 20a.

The uneven portion 5a of the grating pattern having the cross section as shown in FIGS. 3A, 3B, 3C or 3D is formed on at least one surface of the lens 20b. This enables the optical element 20 in the present embodiment also to be provided with the lens function, the infrared cutting function, and the optical low-pass filter function.

Further, the optical element in the present embodiment may take not only the structure of the present embodiment, but also one from structures of combinations with convex or concave lens as shown in FIGS. 5A to 5E or a structure forming a Fresnel lens as shown in FIG. 5F.

If the optical element is constructed in the structure in which the lens is formed on one surface of the flat plate as shown in FIGS. 5B, 5C, or 5F, the uneven portion 5a may be provided on the other surface of the flat plate 20a without lens.

For providing the flat plate 20a with the uneven portion 5a, they may be formed simultaneously upon molding the flat plate 20a. They may be formed by an insertion-molding for inserting the flat plate 20a into a mold and further molding an uneven portion 5a with another member. And a separate member having the uneven portion may be bonded to the flat plate 20a. The material for forming the uneven portion 5a can be a plastic material having good spectral characteristics for the wavelength region used by the taking lens (the visible region in the present invention), for example an acrylic resin or an epoxy resin, etc. There is no specific restriction on a method for forming the phase grating.

The optical low-pass filter function is realized by the phase grating comprised of the uneven portion in the present embodiment, but it may be realized by an amplitude grating or a birefringence crystal.

It is noted here that the concept as disclosed in the first embodiment can also be applied to the present embodiment.

A compact image pickup apparatus can be provided by applying the image pickup system as described in the first embodiment or the second embodiment to a practical video camera or electronic still camera.

As explained above, the present invention enabled the image pickup system to have a single member including the infrared cutting filter function, the optical low-pass filter function, and the lens function, thereby enabling a decrease in the size of the entire image pickup system.

What is claimed is:

1. A taking optical system comprising, in order from the object side:

a fixed lens having a positive refractive power;

a variator having a negative refractive power;

an optical element comprising (a) a lens comprising a material for shutting off substantially all light in the infrared region and (b) an optical low-pass filter, said lens of said optical element and said optical low-pass filter said being integrally and simultaneously produced with the same material by one of injection-molding, cast-molding, and injection compression molding;

a focusing lens having a positive refractive power; and means for taking an image of light transmitted through said fixed lens, said variator, said optical element, and said focusing lens, wherein said optical low-pass filter is provided on at least one surface of said lens of said optical element, said optical low-pass filter comprises a phase grating, and said material contains a copolymer obtained by copolymerization of a monomer mixture consisting of a monomer containing a phosphoric acid group and a monomer copolymerizable therewith, and a metal salt mainly containing a copper salt.

2. A taking optical system according to claim 1, said phase grating having a regular structure in at least one direction.

3. A taking optical system according to claim 1, said phase grating comprising a plurality of projections, said plurality of projections being, in cross section, one of trapezoidal, sinusoidal, and rectangular.

4. A taking optical system comprising, in order from the object side:

a fixed lens having a positive refractive power;

a variator having a negative refractive power;

an optical element comprising a flat plate for shutting off substantially all light in the infrared region, a flat and convex lens wherein said flat plate is cemented to a flat surface side of said flat and convex lens, and an optical low-pass filter incorporated with said flat and convex lens;

a focusing lens having a positive refractive power; and means for taking an image of light transmitted through said fixed lens, said variator, said optical element, and said focusing lens, wherein said optical low-pass filter comprises a phase grating, said optical low-pass filter is provided on a convex surface side of said flat and convex lens, and said material contains a copolymer obtained by copolymerization of a monomer mixture consisting of a monomer containing a phosphoric acid group and a monomer copolymerizable therewith, and a metal salt mainly containing a copper salt.

5. A taking optical system according to claim 4, said phase grating having a regular structure in at least one direction.

6. A taking optical system according to claim 4, said phase grating comprising a plurality of projections, said plurality of projections being, in cross section, one of trapezoidal, sinusoidal, and rectangular.

\* \* \* \* \*